July 19, 1949.　　　A. B. LINSCOTT　　　2,476,610
WHEEL BRAKE FOR RETRACTED LANDING GEARS
Filed July 17, 1946　　　2 Sheets-Sheet 1

INVENTOR.
AUSTIN B. LINSCOTT
BY Richard W. Treverton
ATTORNEY

July 19, 1949. A. B. LINSCOTT 2,476,610
WHEEL BRAKE FOR RETRACTED LANDING GEARS
Filed July 17, 1946 2 Sheets-Sheet 2

INVENTOR.
AUSTIN B. LINSCOTT
BY Richard W. Treverton
ATTORNEY

Patented July 19, 1949

2,476,610

UNITED STATES PATENT OFFICE 2,476,610

WHEEL BRAKE FOR RETRACTED LANDING GEARS

Austin B. Linscott, Attica, N. Y., assignor to Curtiss-Wright Corporation, a corporation of Delaware Application July 17, 1946, Serial No. 684,389

10 Claims. (Cl. 244—111)

This invention relates to aircraft having retractable landing gear and brakes for the landing wheels, and relates particularly to means for associating the landing gear and brake mechanisms for stopping rotation of the wheels during retraction of the gear.

Rotation of the landing wheels subsequent to takeoff is objectionable for the reasons that any unbalance of the wheels results in vibration of the aircraft structure, and, in the case of retractable landing gears, the rotation provides a source of possible damage to the pocket into which the gear is retracted. Some aircraft have been provided with closures for the pockets or wells in which the retracted gear is stowed, and means engageable by the wheel tires during retraction have been provided to operate such closures. In such case the wheels if allowed to rotate impose heavy and unnecessary loads on the mechanism.

For these reasons it has become customary for the pilot to apply the wheel brakes immediately after takeoff, and it has also been proposed to provide friction blocks, or the like, engageable by the wheels upon reaching retracted position to arrest their rotation. These two means of stopping wheel rotation have not been altogether satisfactory for the reason that the first requires the pilot's attention at a critical time when he may have several other operations to perform, and the second because damage may be done to adjacent parts of the aircraft by the wheels before their rotation is arrested. Furthermore it may, in some cases, be desirable to allow the wheel to be rotatable in the retraction well or pocket so that it may roll rather than slide over parts which it may contact in the well during the terminal phases of retraction.

The present invention has among its objectives and provides means operated by the retracting gear mechanism for applying the wheel brakes during gear retraction, and, preferably, for again releasing the brakes during the terminal phases of such retraction. Means are provided whereby the motion of the retracting gear mechanism is caused to operate the same brake actuating mechanism that is operated manually by the pilot whereby no additional brake mechanism per se need be added to the aircraft, so that the automatic braking means increases total weight only slightly. The invention also provides an arrangement applicable to aircraft in which the brake pedal is incorporated in the rudder pedal assembly, whereby the application of braking force by the gear retraction mechanism will not substantially affect the pilot's control operation of the rudder, and likewise will not hinder his manual operation of the wheel brakes.

These and other objects and advantages will become apparent from the following description of the typical embodiment of the invention shown in the accompanying drawings, wherein:

Fig. 7 is a view of the cam as viewed from the direction indicated at 7—7 in Fig. 5.

Figure 1:
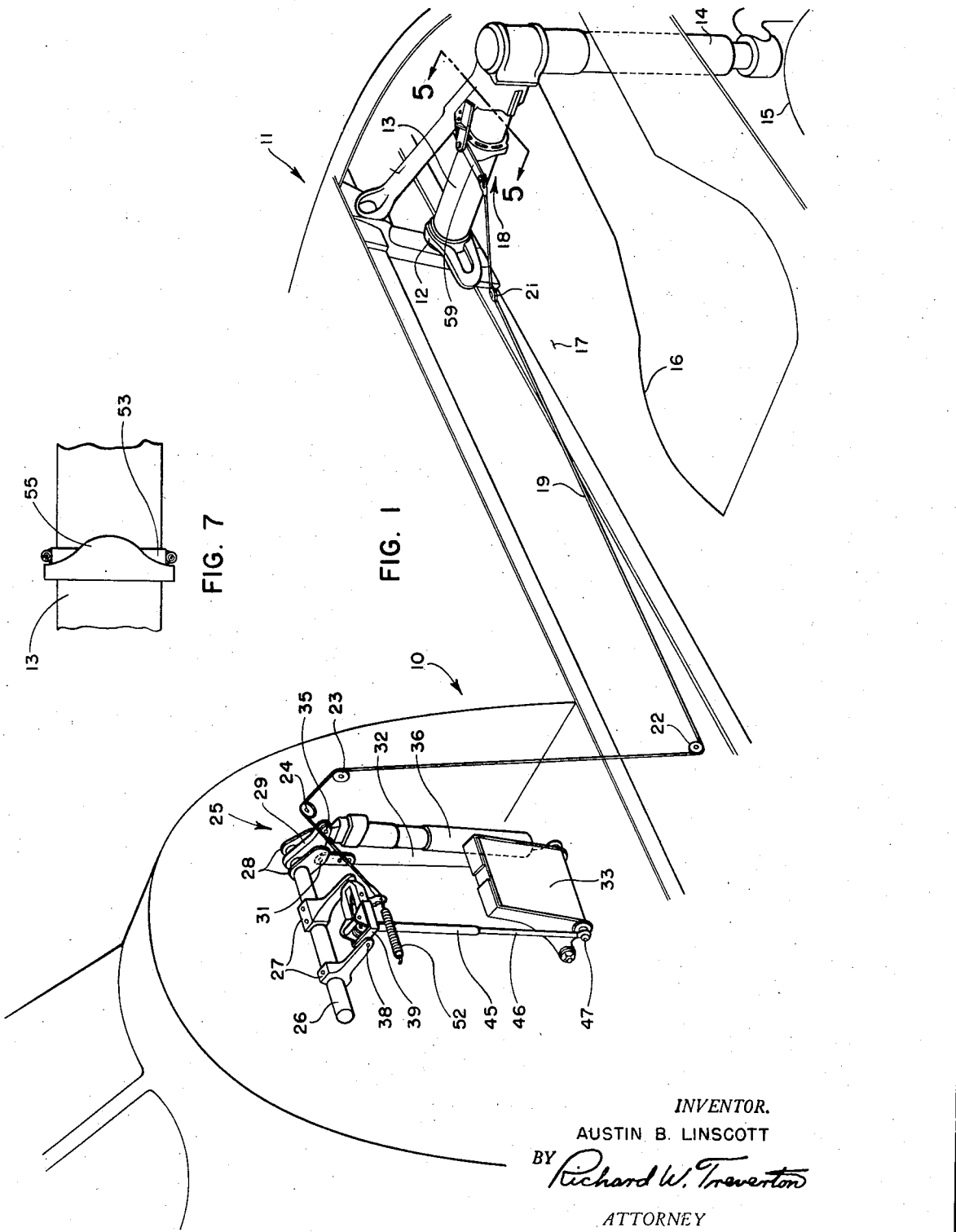
Fig. 1 is a fragmentary perspective view of an aircraft with the present invention applied thereto.

The aircraft indicated generally at 10 in Fig. 1 has a cantilever wing construction 11 upon which is rotatably mounted by supports 12 a substantially horizontal, longitudinally extending torque tube 13 which at its forward end carries a landing gear shock strut 14. A landing wheel 15 provided with suitable brake means (not shown) is carried at the lower end of the strut 14, which is substantially upright when the landing gear is in extended or landing position. The gear is retractable upon rotation of the torque tube, clockwise from the position shown, through approximately ninety degrees, bringing the strut 14 to a substantially horizontal position wherein it and the wheel 15 have passed through an opening 16 in the lower surface 17 of the wing into a housed position within the wing. Such retraction is effective through cam means, indicated generally at 18, and a cable 19 extended over pulleys 21, 22, 23 and 24 to operate a wheel brake actuating mechanism associated with a rudder pedal assembly 25 to arrest rotation of wheel 15 while the latter is moving from extended to retracted position.

Left and right rudder pedal assemblies 25, only the left being shown in Fig. 1 since the right assembly is similar, are supported in the pilot's compartment of the aircraft on arms 27, 28 and 29 extending forwardly from a fixed tube 26. Pivoted at 31 to one of arms 28 is a pedal hanger strut 32 to the lower end of which a pedal 33 is pivoted at 34. Pivoted at 35 to the bifurcated end of arm 29 is a brake actuating strut 36 whose lower end is pivoted at 37 to the pedal 33. The strut 36 comprises a plurality of telescoping elements constituting an hydraulic cylinder and plunger so arranged that upon extension brake fluid is displaced for actuating the brake of wheel 15. The details of the strut, the hydraulic connections between the strut and the wheel brake, and the wheel brake per se, form no part of the present invention; and as the same are well known and understood in the art they require no further description or illustration. It is sufficient to point out that fore and aft movement of the left and right hanger struts 32 about pivots 31 by pressure applied to the lower extremity of pedals 33, is effective through connections not shown to operate the aircraft rudder in the normal manner. During such operation the strut 36 acts as a solid link and together with the strut 32, pedal 33 and rams 28, 29 defines a quadrangle assembly which serves to hold the pedal substantially upright. To manually apply either wheel brake, the corresponding pedal 33 is moved forwardly (clockwise in Figs. 1 and 2) about pivot axis 34. Such movement will result in extension of the strut between its pivot 35 and 37 to cause application of the wheel brake.

Connected to arms 27 by pivots 38, which are substantially aligned axially with pivots 35, is a frame 39. To the frame is pivoted at 41, on an axis normal to that of pivots 38, a lever having arms 42, 43 and 51. Arm 42 is pivotally connected by pin 44 to the upper end of a strut comprising telescoping parts 45 and 46, the lower of which is pivoted at 47 to pedal 33. Pivot 47 is axially aligned with pivot 37 and, since pivots 38 and 35 also lie along the same axis, it will be seen that in effect the strut 45, 46 and strut 36 will move in unison during rudder operating movement of the assembly.

Figures 2, 3, 4, 5, 6:
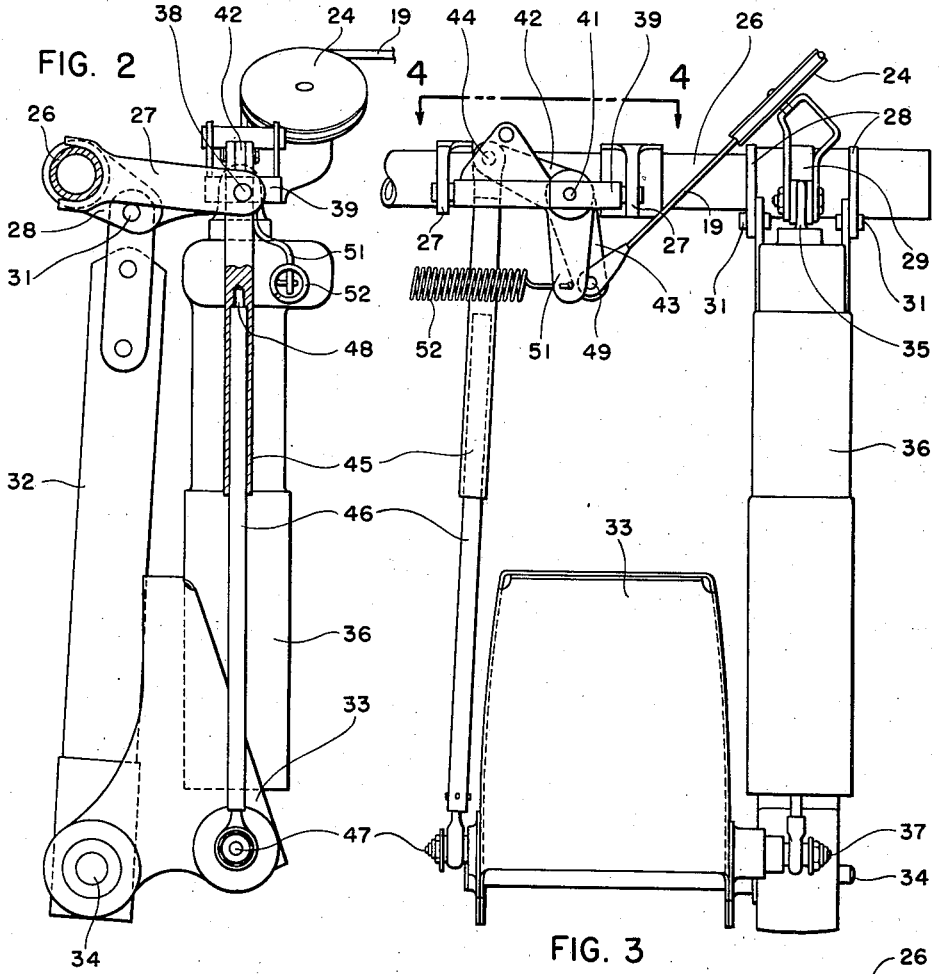
Figs. 2 and 3 are respectively side and front elevations of the rudder and brake pedal assembly shown in Fig. 1.
Fig. 4 is a fragmentary plan view as viewed from the line 4—4 of Fig. 3.
Fig. 5 is a detail sectional view taken as indicated by line 5—5 of Fig. 1, showing a cam and cam follower mechanism which constitutes a part of the invention.
Fig. 6 is a side elevational view of the mechanism shown in Fig. 5.

The upper end of part 46 abuts shoulder 48 in the bore of telescoping part 45, preventing compressive telescoping movement from the normal position of the parts shown in Figs. 2 and 3, but allowing free telescoping extension of the strut 45, 46 in order that the brake actuating strut may be extended as described above in manual application of the wheel brake.

As shown in Figs. 2 and 3 the pulley 24 may be mounted upon a bracket on support arm 29 to direct the end of cable 19 in the general plane of lever 42, 43, the cable being attached at 49 to lever arm 43.

The arm 51 provided on the lever 42, 43 is connected by a spring 52 to a similar arm on the right rudder pedal assembly. It will be seen that the effect of the spring 52 is to hold the cable 19 in tension and prevent unintended compression force being applied through strut 45, 46 to the pedal 33. A pull on cable 19, however, will swing the lever 42, 43, 51 counterclockwise in Figs. 1 and 3, to thrust the strut 45, 46 downwardly, swinging the pedal 33 clockwise as viewed in Figs. 1 and 2 to extend the brake actuating strut 36 and thereby apply the wheel brake. A stop pin 50 (see Fig. 4) on the frame 39 limits clockwise movement of the lever 42, 43, 51 as the latter is viewed in Fig. 3.

Turning now to the cam means 18, it will be seen from Figs. 1 and 5 to 7, that a ring comprising two sections 53 and 54 is clamped on the landing gear torque tube 13, and that the part 53 has a rearwardly directed cam face having lobe 55 engaged by a cam follower roller 56. The roller is mounted on one arm 57 of a lever that is pivoted at 58 to the landing gear support 12 and whose opposite arm 59 is connected to the cable 19. The lobe 55 preferably is so designed and related to the torque tube 13 and roller 56 that when the landing gear is fully extended and also when it is fully retracted the roller engages a face portion of the cam to one side or the other of the lobe, and will ride on the crest of the lobe only when the landing gear is in an intermediate position of retraction (or extension). The spring 52 will at all times hold the cam follower against the cam.

From the foregoing it will be understood that as the landing gear is retracted the cam follower will be moved rearwardly, swinging the lever counterclockwise as it is viewed in Fig. 1, to exert a pull on the cable 19, and through the rudder-brake pedal assembly applying the wheel brake. The arrangement described accomplishes the objectives of the invention heretofore set out, and does so with the addition to other required aircraft and braking structure of very few and light weight parts, which do not interfere with other installations on, or operations of, the aircraft. It will be understood further that the arrangement specifically shown and described is merely illustrative of the inventive principles involved and that these principles may be otherwise embodied without departing from the spirit of the invention or the scope of the appended claims.

I claim:

1. In an aircraft having a retractable landing gear including a landing wheel provided with a brake, said brake being movable with the wheel as the gear is moved between projected and retracted positions, and said brake being operable to brake rotation of the wheel in any position of projection or retraction of the landing gear, an actuator for the brake operable by the aircraft operator, and means operable by and upon retractive movement of the landing gear for operating said actuator to apply the brake.

2. In an aircraft having a retractable landing gear including a landing wheel provided with a brake, said landing gear including an element movable during retraction of the gear, an actuator for the brake movable between brake releasing and brake applying positions, and means associating said element and actuator for moving the latter between brake releasing and brake applying positions and return to brake releasing position during retractive movement of said element.

3. In an aircraft having a retractable landing gear including a landing wheel provided with a brake, said landing gear including an element movable during retraction of the gear, a pilot operable actuator for the brake, and means operable by and during such movement of said element for operating the actuator to apply the brake.

4. In an aircraft having a retractable landing gear including a landing wheel provided with a brake, said landing gear including an element movable during retraction of the gear, a pilot operable actuator for the brake movable between brake releasing and brake applying positions, and means associating said element and actuator for moving the latter to brake applying position and return to brake releasing position during retractive movement of said element.

5. In an aircraft having a retractable landing gear including a landing wheel provided with a brake, said landing gear including an element movable angularly during retraction of the gear; cam means including a cam carried by said element and a cam follower carried by the aircraft, and a brake actuator operated by said cam means, said cam means being arranged to effect application of the brake during retractive movement of the gear.

6. In an aircraft having a retractable landing gear including a landing wheel provided with a brake, said landing gear including an element movable angularly during retraction of the gear, cam means including a cam carried by said element and a cam follower carried by the aircraft, and a brake actuator operated by said cam means, said cam being contoured to cause application of the brake and subsequent release of the brake during retractive movement of the gear.

7. In an aircraft having a retractable landing gear including a landing wheel provided with a brake, said landing gear including a movable element, a cam carried by said element, a cam follower carried by the aircraft, a pilot operable brake actuator, and means connecting the cam follower and said actuator for applying the brake during retraction of the gear.

8. In an aircraft having a retractable landing gear including a landing wheel provided with a brake and a rudder pedal assembly having a pilot operable brake actuator carried thereby, and means operable by and during retraction of said gear for moving said actuator to apply the brake.

9. In an aircraft having a retractable landing gear including a landing wheel provided with a brake and a rudder pedal assembly, said assembly comprising a hanger pivoted to the aircraft and a brake pedal pivoted to the hanger, a brake actuating strut pivoted to the aircraft and to the pedal to define therewith a quadrangle link assembly, a lever having a second strut pivoted thereto, said lever being pivoted to the aircraft substantially along the axis of pivot of the first strut to the aircraft and also being pivoted to the aircraft about an axis substantially normal to the first axis, said second strut being pivoted to the pedal substantially along the axis of pivot of the first strut to the pedal and constituting a play connection link, and means operable by and during retraction of the gear for swinging said lever about said substantially normal axis to operate the brake actuating strut.

10. In an aircraft rudder pedal assembly, a hanger pivoted to the aircraft for rudder control movement and a brake pedal pivoted to the hanger, a brake actuating strut pivoted to the aircraft on a first axis and to the pedal along a second axis to define therewith a quadrangle link assembly, a lever having a second strut pivoted thereto, said lever being pivoted to the aircraft substantially along said first axis and to the pedal substantially along said second axis, and said lever also being pivoted to the aircraft about an axis substantially normal to said first axis, whereby the lever may be swung about said substantially normal axis to operate the brake actuating strut without substantially affecting movement of the assembly as a rudder control.

AUSTIN B. LINSCOTT.

REFERENCES CITED

The following references are of record in the file of this patent:

UNITED STATES PATENTS

| Number | Name | Date |
| --- | --- | --- |
| 2,263,427 | Page | Nov. 18, 1941 |